(12) United States Patent
Rebih (10) Patent No.: US 11,059,962 B2
(45) Date of Patent: Jul. 13, 2021

(54) POLYMER BLENDS (71) Applicant: ImerTech SAS, Paris (FR)

(72) Inventor: Fatima Rebih, Toulouse (FR)

(73) Assignee: ImerTech SAS, Paris (FR)

( * ) Notice: Subject to any disclaimer, the term of this patent is extended or adjusted under 35 U.S.C. 154(b) by 0 days.

(21) Appl. No.: 15/735,633

(22) PCT Filed: Oct. 14, 2016

(86) PCT No.: PCT/GB2016/053195
§ 371 (c)(1),
(2) Date: Dec. 12, 2017

(87) PCT Pub. No.: WO2017/064508
PCT Pub. Date: Apr. 20, 2017

(65) Prior Publication Data
US 2018/0312672 A1 Nov. 1, 2018

(30) Foreign Application Priority Data

Oct. 14, 2015 (GB) ..................................... 1518169

(51) Int. Cl.
| | | |
|---|---|---|
| C08L 23/06 | (2006.01) | |
| C09C 3/08 | (2006.01) | |
| C08K 13/02 | (2006.01) | |
| C08L 23/12 | (2006.01) | |
| C08K 9/04 | (2006.01) | |
| C08K 3/30 | (2006.01) | |
| C08K 3/26 | (2006.01) | |
| C08K 5/09 | (2006.01) | |
| C08K 3/34 | (2006.01) | |
| C08K 3/22 | (2006.01) | |

(52) U.S. Cl.
CPC ............... C08L 23/06 (2013.01); C08K 3/22 (2013.01); C08K 3/26 (2013.01); C08K 3/30 (2013.01); C08K 3/34 (2013.01); C08K 5/09 (2013.01); C08K 9/04 (2013.01); C08K 13/02 (2013.01); C08L 23/12 (2013.01); C09C 3/08 (2013.01); C08K 2003/265 (2013.01); C08K 2201/005 (2013.01); C08L 2205/02 (2013.01); C08L 2205/08 (2013.01)

(58) Field of Classification Search
CPC ... C08L 23/06; C08L 2205/02; C08L 2205/08
See application file for complete search history.

(56) References Cited

U.S. PATENT DOCUMENTS

| | | | | | |
|---|---|---|---|---|---|
| 3,803,065 | A | * | 4/1974 | Arai | ........................ C08K 9/04 106/499 |
| 3,926,873 | A | * | 12/1975 | Aishima | .................. C08K 5/09 525/36 |
| 4,242,251 | A | * | 12/1980 | Aishima | .................. C08K 9/04 106/483 |
| 2011/0105667 | A1 | * | 5/2011 | Brenner | .................. C08L 23/06 524/423 |
| 2012/0283368 | A1 | | 11/2012 | Nagamatsu et al. | |
| 2014/0154445 | A1 | * | 6/2014 | Slater | ....................... C08J 11/04 428/36.4 |
| 2015/0112009 | A1 | * | 4/2015 | Fukumoto | ................. C09C 3/08 524/300 |

FOREIGN PATENT DOCUMENTS

| | | | | |
|---|---|---|---|---|
| CN | 1709960 | A | * 6/2005 | ............. C08L 23/16 |
| CN | 103748151 | A | 4/2014 | |
| EP | 2 537 883 | A1 | 12/2012 | |
| GB | 1 496 088 | A | 12/1977 | |
| JP | H07 33990 | A | 2/1995 | |
| JP | 2012 041524 | A | 3/2012 | |
| JP | 2014-523462 | A | 9/2014 | |
| JP | 5851748 | B2 | 2/2016 | |
| WO | WO 2011/092844 | | 8/2011 | |
| WO | WO 2012/175504 | A1 | 12/2012 | |

OTHER PUBLICATIONS

IUPAC Compendium of Chemical Terminology, 2014; entry for Fatty Acids.*
Chu, Y.H., et al.; IM & P Chemical Minerals and Processing, 2007, No. 1, p. 12-14; machine translation.*
Gu, J., et al.; Advances in Polymer Technology, 2013, vol. 32, No. 1, p. 1-9.*
International Search Report and Written Opinion dated Dec. 21, 2016, in International Application No. PCT/GB2016/053195 (12 pgs.).
Tabtiang et al., "The performance of selected unsaturated coatings for calcium carbonate filler in polypropylene", European Polymer Journal 36, Jan. 1, 2000, pp. 137-148; Retrieved from the Internet: URL:http://www.sciencedirect.com/science/article/pii/S0014305799000555 [retrieved on Dec. 7, 2016].

(Continued)

Primary Examiner — Robert S Jones, Jr.
(74) Attorney, Agent, or Firm — Finnegan, Henderson, Farabow, Garrett & Dunner, LLP (57) ABSTRACT Compatibilizer for a polymer blend, use of the compatabilizer in a polymer, a polymer blend comprising the compatabilizer, an article formed from the polymer blend, and methods for making the compatabilizer, polymer blend and article.

17 Claims, 2 Drawing Sheets

(56) References Cited

OTHER PUBLICATIONS

Database WPI, Week 201219, Thomson Scientific, AN 2015-C69117; Abstract of JP 2012 041524 A, Shiraishi Chuo Kenkyusho KK, Mar. 1, 2012; 3 pgs.
Database WPI, Week 199515, Thomson Scientific, AN 1995-110811; Abstract of JP H07 33990 A, Kyowa Kagaku Kogyo KK, Feb. 3, 1995; 2 pgs.
Davies, "A Quantitative Kinetic Theory of Emulsion Type. I. Physical Chemistry of the Emulsifying Agent," Proceedings of $2^{nd}$ International Congress Surface Activity, pp. 426-438 (1957).
Miller et al., "A new empirical method to calculate average molecular polarizabilities," J. Am. Chem. Soc. 101(24): 7206-7213 (1979).
Search Report for Chinese Application No. 2016800397028, dated Oct. 9, 2019.

\* cited by examiner

POLYMER BLENDS

CLAIM FOR PRIORITY

This application is a U.S. national phase entry under 35 U.S.C. § 371 from PCT International Application No. PCT/GB2016/053195, filed Oct. 14, 2016, which claims the benefit of priority of GB Application No. 1518169.6, filed Oct. 14, 2015, both of which this application claims priority and both of which are incorporated herein by reference.

TECHNICAL FIELD

The present invention is directed to a compatibilizer for a polymer blend, to the use of the compatibilizer in a polymer blend, to a polymer blend comprising the compatibilizer, to an article formed from the polymer blend, and to methods for making the compatibilizer, polymer blend and article.

BACKGROUND OF THE INVENTION

There is an ever increasing demand to recycle and re-use polymer materials since this provides cost and environmental benefits. However, the reprocessing of recycled polymer waste presents challenges which are not necessarily encountered during processing of polymer compositions derived from virgin polymer. For example, recycled polymers often contain mixtures of different polymer types which may adversely affect the processability of the polymer mixture and/or physical properties of articles manufacture from the polymer mixture.

As the need to recycle polymer waste materials increases, there is a continuing need for the development of new compositions for the economically viable processing of polymer mixtures into high quality articles of manufacture.

SUMMARY OF THE INVENTION

According to a first aspect, the present invention is directed to a compatibilizer for a polymer blend, the compatibilizer comprising a particulate and an organic linker on a surface of the particulate, wherein the organic linker is a basic form of an organic acid comprising an oxygen-containing acid functionality and at least one carbon-carbon double bond.

According to a second aspect, the present invention is directed to a compatibilizer for a polymer blend, the compatibilizer comprising a particulate and organic linker on a surface of the particulate, wherein the compatibilizer is obtained by at least partially dehydrating an organic acid having an oxygen-containing acid functionality and comprising at least one carbon-carbon double bond in the presence of the particulate.

According to a third aspect, the present invention is directed to the use of a compatibilizer according to the first or second aspects in a polymer blend.

According to a fourth aspect, the present invention is directed to the use of an organic linker as defined in the first or second aspects in a compatibilizer for a polymer blend.

According to a fifth aspect, the present invention is directed to a polymer blend comprising a compatibilizer according to the first or second aspects.

According to a sixth aspect, the present invention is directed to a method for making a compatibilizer for a polymer blend, the method comprising combining an organic linker as defined the first or second aspects with a particulate.

According to a seventh aspect, the present invention is directed to a method for making a polymer blend comprising a compatibilizer, the method comprising preparing, providing or obtaining a compatibilizer according to the first or second aspects, and compounding the compatibilizer with a polymer blend.

According to an eighth aspect, the present invention is directed to an article formed from a polymer blend according to the fifth aspect or obtainable by the method of the seventh aspect.

According to a ninth aspect, the present invention is directed to the use of a polymer blend according to the fifth aspect in the manufacture of an article.

According to a tenth aspect, the present invention is directed to a method for making an article according the eighth aspect, comprising forming the article from a polymer blend according to the fifth aspect, optionally wherein forming comprises extrusion or moulding, for example, injection or blow moulding.

DETAILED DESCRIPTION OF THE INVENTION

Compatibilizer

The compatibilizer is for use in a polymer blend, i.e., a polymer composition which comprises a mixture of different polymer types. The compatibilizer comprises a particulate and an organic linker on a surface of the particulate. The organic linker has an oxygen-containing acid functionality. The organic linker is a basic form of an organic acid. By "basic form" is meant that the organic acid is at least partially deprotonated, e.g., by dehydrating an organic acid to form the corresponding oxyanion. In certain embodiments, the basic form of an organic acid is the conjugate base of the organic acid. The organic acid (and, thus, the organic linker) comprises at least one carbon-carbon double bond.

In certain embodiments, the organic linker is a non-polymeric species and, in certain embodiments, has a molecular mass of no greater than about 400 g/mol. By "non-polymeric" is meant a species which (i) is not formed by the polymerization of monomeric species, and/or (ii) has a relatively low molecular mass, e.g., a molecular mass of less than about 1000 g/mol, for example, a molecular mass of no greater than about 400 g/mol, and/or (iii) comprises no more than 70 carbon atoms in a carbon chain, for example, no more than about 25 carbon atoms in a carbon chain.

In certain embodiments, the non-polymeric species has a molecular mass of no greater than about 800 g/mol, or no greater than about 600 g/mol, or no greater than about 500 g/mol, or no greater than about 400 g/mol, or no greater than about 300 g/mol, or no greater than about 200 g/mol. Alternatively or additionally, in certain embodiments, the non-polymeric species comprises no more than about 50 carbon atoms, or no more than about 40 carbon atoms, or no more than about 30 carbon atoms, or no more than about 25 carbon atoms, or no more than about 20 carbon atoms, or no more than about 15 carbon atoms.

In certain embodiments, the compatibilizer comprises particulate and an organic linker on a surface of the particulate, the compatibilizer being obtained by at least partially dehydrating an organic acid having an oxygen-containing acid functionality and comprising at least one carbon-carbon double bond in the presence of the particulate.

An exemplary organic acid is a carboxylic acid, and its basic form a carboxylate, e.g., respectively, wherein R is an unsaturated $C_{2+}$ group containing at least one carbon-carbon double bond. The carboxylate group (which is an oxyanion) is depicted in resonance form. The carboxylate group is an example of a conjugate base. In certain embodiments, R is an unsaturated $C_{3+}$ group, or an unsaturated $C_{4+}$ group, or an unsaturated $C_{5+}$ group.

Without wishing to be bound by theory, it is believed that the basic form of the acid functionality coordinates/associates with the surface of the particulate, and the organic tail having at least one carbon-carbon double bond coordinates/associates with the different polymer species in the polymer blend. Thus, the compatibilizer serves to cross-link or graft the different polymer types, with the organic linker acting as coupling modifier, wherein the coupling involves a physical (e.g., steric) and/or chemical (e.g., chemical bonding, such as covalent or van der Waals) interaction between the different polymers and between the polymers and the particulate. The overall effect is to enhance the compatibility of the different polymer types in the polymer blend which, in turn, may enhance processing of the polymer blend and/or one or more physical properties (e.g., one or more mechanical properties) of an article of manufacture made from the polymer blend. The surface of the particulate may serve to balance the anionic charge of the organic linker. Further, the compatibilizing effect may enable greater quantities of particulate to be incorporated without adversely affecting the processability of the polymer blend and/or the physical properties of the articles made from the polymer blend. This, in turn, may reduce costs because less polymer (recycled or otherwise) is used.

In certain embodiments, the organic linker is the conjugate base of an organic acid, for example, a carboxylate or phosphate or phosphite or phosphinate or amino acid. In certain embodiments, the organic linker is a carboxylate. In alternate embodiments, the organic linker includes a maleimide ring (e.g., with an amide carboxylate functionality coordinates/associates with the surface of the particulate and an a carbon-carbon double bond coordinates/associates with the different polymer species in the polymer blend).

In certain embodiments, the organic linker comprises at least one carbon atom in addition to the carbon-carbon double bond. In certain embodiments, the organic linker comprises at least two carbon atoms, or at least three carbon atoms, or at least four carbon atoms, or at least five carbon atoms in addition to the carbon-carbon double bond. In certain embodiments, the organic linker comprises at least six carbon atoms, for example, a chain of at least six carbon atoms, including the at least one carbon-carbon double bond. In certain embodiments, the organic linker comprises only one carbon-carbon double bond. In certain embodiments, the organic linker comprises two carbon-carbon double bonds. In certain embodiments, the organic linker comprises three carbon-carbon double bonds. The moieties about the at least one carbon-carbon double bond may be arranged in a cis or trans configuration. The carbon-carbon double bond may be a terminal group or may be internal to the molecule, i.e., within the chain of carbon atoms.

In certain embodiments, the organic linker is:

(1)

and/or (2)

wherein a is equal to or greater than 3;
wherein b is equal to or greater than 1, and c is equal to or greater than 0, provided that b+c is at least 2; and
wherein Z is a carboxylate group, a phosphate group, a phosphite or a phosphinate group.

In certain embodiments, a is from 6 to 20, for example, from 6 to 18, or 6 to 16, or 6 to 14, or 6 to 12, or 6 to 10, or 7 to 9. In certain embodiments, a is 8.

In certain embodiments, b and c are each independently from 4 to 10, for example, each independently from 5 to 11, or from 5 to 10, or from 6 to 9, or from 6 to 8. In certain embodiments, b and c are both 7.

In certain embodiments, when the organic linker is of formula (1), Z is a carboxylate group. In such embodiments, the compatibilizer may consist essentially of, or consist of, particulate (e.g., mineral particulate) and the organic linker of formula (1) and wherein Z is a carboxylate group.

In certain embodiments, when the organic linker is of formula (2), Z is a carboxylate group. In such embodiments, the compatibilizer may consist essentially of, or consist of, particulate (e.g., mineral particulate) and the organic linker of formula (2) and wherein Z is a carboxylate group.

In certain embodiments, the organic linker is a mixture of formula (1) and formula (2), optionally wherein Z is, in each case, a carboxylate group. In such embodiments, the compatibilizer may consist essentially of, or consist of, particulate (e.g., mineral particulate) the organic linker of formula (1) and wherein Z is a carboxylate group, and the organic linker of formula (2) and wherein Z is a carboxylate group.

In certain embodiments, the organic acid is an unsaturated fatty acid or derived from an unsaturated fatty acid. In certain embodiments, when the organic acid is an unsaturated fatty acid, the compatibilizer consists essentially of, or consists of, particulate (for example, mineral particulate) and organic linker. In such embodiments, the unsaturated fatty acid may be selected from one of myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucuc acid and docosahexanoic acid. In such embodiments, the unsaturated fatty acid may be oleic acid, i.e., in certain embodiments, the compatibilizer comprises particulate (for example, mineral particulate) and the basic form of oleic acid. In certain embodiments, the compatibilizer consists of particulate (for example, mineral particulate) and the basic form of oleic acid.

In certain embodiments, the organic acid is derived from an unsaturated fatty acid. In certain embodiments, the organic acid is undecylenic acid, i.e., the organic linker is the basic form of undecylenic acid. In certain embodiments, the compatibilizer consists of particulate (for example, mineral particulate) and the basic form of undecylenic acid.

In certain embodiments, the particulate is an inorganic particulate, for example, a mineral.

In certain embodiments, the particulate is an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof.

In certain embodiments, the particulate is calcium carbonate, for example, ground calcium carbonate. The particulate calcium carbonate may be obtained from a natural source by grinding, i.e., a ground calcium carbonate. Ground calcium carbonate (GCC) is typically obtained by crushing and then grinding a mineral source such as chalk, marble or limestone, which may be followed by a particle size classification step, in order to obtain a product having the desired degree of fineness. Other techniques such as bleaching, flotation and magnetic separation may also be used to obtain a product having the desired degree of fineness and/or colour. The particulate solid material may be ground autogenously, i.e. by attrition between the particles of the solid material themselves, or, alternatively, in the presence of a particulate grinding medium comprising particles of a different material from the calcium carbonate to be ground. These processes may be carried out with or without the presence of a dispersant and biocides, which may be added at any stage of the process.

Precipitated calcium carbonate (PCC) may be used as the source of particulate calcium carbonate in the present invention, and may be produced by any of the known methods available in the art.

The $d_{50}$ of the inorganic particulate may be less than about 100 μm, for example, less than about 80 μm for example, less than about 60 μm for example, less than about 40 μm, for example, less than about 20 μm, for example, less than about 15 μm, for example, less than about 10 μm, for example, less than about 8 μm, for example, less than about 6 μm, for example, less than about 5 μm, for example, less than about 4, for example, less than about 3 μm, for example less than about 2 μm, for example, less than about 1.5 μm or, for example, less than about 1 μm. The $d_{50}$ of the inorganic particulate may be greater than about 0.5 μm, for example, greater than about 0.75 μm greater than about 1 μm, for example, greater than about 1.25 μm or, for example, greater than about 1.5 μm. The $d_{50}$ of the inorganic particulate may be in the range of from 0.5 to 20 μm, for example, from about 0.5 to 10 μm, for example, from about 1 to about 5 μm, for example, from about 1 to about 3 μm, for example, from about 1 to about 2 μm, for example, from about 0.5 to about 2 μm or, for example, from about 0.5 to 1.5 μm, for example, from about 0.5 to about 1.4 μm, for example, from about 0.5 to about 1.4 μm, for example, from about 0.5 to about 1.3 μm, for example, from about 0.5 to about 1.2 μm, for example, from about 0.5 to about 1.1 μm, for example, from about 0.5 to about 1.0 μm, for example, from about 0.6 to about 1.0 μm, for example, from about 0.7 to about 1.0 μm, for example about 0.6 to about 0.9 μm, for example, from about 0.7 to about 0.9 μm.

In certain embodiments, the particulate, for example, inorganic particulate such as, for example, mineral particulate has a $d_{50}$ of no greater than about 2.5 μm, for example, no greater than about 1.5 μm. In certain embodiments, the particulate has a $d_{50}$ of from about 0.1 μm to about 2.0 μm, for example, from about 0.1 μm to about 1.5 μm, or from about 0.1 μm to about 1 μm, or from about 0.2 μm to about 0.9 μm, or from about 0.2 μm to about 0.7 μm, or from about 0.3 μm to about 0.7 μm, or from about 0.4 μm to about 0.6 μm, or from about 0.5 μm to about 0.6 μm. In certain embodiments, the particulate has a $d_{50}$ of from about 0.5 μm to about 1.5 μm, or from about 0.6 μm to about 1.4 μm, or from about 0.7 μm to about 1.3 μm, or from about 0.8 μm to about 1.2 μm, or from about 0.9 μm to about 1.1 μm. The particle sizes described herein pertain to the particulate absent any surface treatment agent.

Unless otherwise stated, particle size properties referred to herein for the inorganic particulate materials are as measured by the well known conventional method employed in the art of laser light scattering, using a CILAS 1064 instrument (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value. The particle size $d_{30}$, $d_{70}$ and $d_{90}$ are to be understood analogously.

The $d_{90}$ (also referred to as the top cut) of the inorganic particulate may be less than about 150 μm, for example, less than about 125 μm for example, less than about 100 μm for example, less than about 75 μm, for example, less than about 50 μm, for example, less than about 25 μm, for example, less than about 20 μm, for example, less than about 15 μm, for example, less than about 10 μm, for example, less than about 8 μm, for example, less than about 6 μm, for example, less than about 4 μm, for example, less than about 3 μm or, for example, less than about 2 μm. Advantageously, the $d_{90}$ may be less than about 25 μm.

Additionally, in certain embodiments, the particulate has a $d_{90}$ of from about 1.0 to about 10 μm, for example, from about 1.0 to about 8 μm, or from about 1.5 μm to about 6 μm, or from about 1.5 μm to about 5 μm, or from about 1.5 μm to about 4 μm, or from about 1.5 μm to about 3 μm, or from about 1.5 μm to about 2.5 μm, or from about 1.75 μm to about 2.25 μm, or from about 1.9 μm to about 2.1 μm.

Additionally, in certain embodiments, the particulate is characterised by a narrow particle size distribution. A narrower particle size distribution is indicative of a steeper particle size, e.g., by a particle steepness which equates to $(d_{30}/d_{70}) \times 100$. The inorganic particulate may have a particle steepness equal to or less than about 100, for example, from about 10 to about 100. The inorganic particulate may have a particle steepness equal to or less than about 75, or equal to or less than about 50, or equal to or less than about 40, or equal to or less than about 30. The inorganic particulate may have a particle steepness from about 10 to about 50, or from about 10 to about 40.

The compatibilizer may be present in the polymer blend in an amount ranging from about 1% up to about 70% by weight, based on the total weight of the polymer blend (i.e., the total weight of the polymer blend comprising polymer, compatibilizer and any other components). For example, from about 2% to about 60% by weight, or from about 3% to about 50% by weight, or from about 4% to about 40% by weight, or from about 5% to about 30% by weight, or from about 6% to about 25% by weight, or from about 7% to about 20% by weight, or from about 8% to about 15% by weight, or from about 8% to about 12% by weight, based on the total weight of the polymer blend. In certain embodiments, the compatibilizer is present in the polymer blend in an amount ranging from about 5% by weight to about 35% by weight, for example, from about 10% by weight to about 30% by weight, or from about 10% by weight to about 25% by weight, or from about 12% by weight to about 25% by weight, or from about 15% by weight to about 25% by weight, or from about 10% by weight to about 20% by weight, or from about 20% by weight to about 30% by weight, based on the total weight of the polymer blend. The compatibilizer may be present in amount less than or equal to about 80% by weight of the polymer blend, for example, less than or equal to about 70% by weight, or less than or equal to about 60% by weight, or less than or equal to about 50% by weight, or less than or equal to about 40% by weight, or less than or equal to about 30% by weight, or less than or equal to about 20% by weight, or less than or equal to about 10% by weight, based on the total weight of the polymer blend.

The organic linker of the compatibilizer may be present in an amount of from about 0.01% by weight to about 5% by weight, based on the total weight of the polymer blend, for example, from about 0.02% by weight to about 4% by weight, o, or from about 0.05% by weight to about 2.5% by weight, or from about 0.05% by weight to about 1.5% by weight, or from about 0.05% by weight to about 1.0% by weight, or from about 0.05% by weight to about 0.8% by weight, or from about 0.1% by weight to about 0.7% by weight, or from about 0.15% by weight to about 0.7% by weight, or from about 0.3% by weight to about 0.7% by weight, or from about 0.5% by weight to about 0.7% by weight, or from about 0.02% by weight to about 0.5%, or from about 0.05% by weight to about 0.5% by weight, or from about 0.1% by weight to about 0.5% by weight, or from about 0.15% by weight to about 0.5% by weight, or from about 0.2% by weight to about 0.5% by weight, or from about 0.3% by weight to about 0.5% by weight, based on the total weight of the polymer blend.

Additionally or alternatively, the organic linker may be present in an amount equal to or less than about 5 wt. % based on the total weight of the compatibilizer, for example equal to or less than about 2 wt. % or, for example equal to or less than about 1.5 wt. %. In an embodiment, the organic linker is present in the compatibilizer in an amount equal to or less than about 1.2 wt. % based on the total weight of the compatibilizer, for example equal to or less than about 1.1 wt. %, for example equal to or less than about 1.0 wt. %, for example, equal to or less than about 0.9 wt. %, for example equal to or less than about 0.8 wt. %, for example equal to or less than about 0.7 wt. %, for example, less than or equal to about 0.6 wt. %, for example equal to or less than about 0.5 wt %, for example equal to or less than about 0.4 wt. %, for example equal to or less than about 0.3 wt. %, for example equal to or less than about 0.2 wt. % or, for example less than about 0.1 wt. %. Typically, the organic linker is present in the compatibilizer in an amount greater than about 0.05 wt. %. In further embodiments, the organic linker is present in the compatibilizer in an amount ranging from about 0.1 to 2 wt. % or, for example, from about 0.2 to about 1.8 wt. %, or from about 0.3 to about 1.6 wt. %, or from about 0.4 to about 1.4 wt. %, or from about 0.5 to about 1.3 wt. %, or from about 0.6 to about 1.2 wt. %, or from about 0.7 to about 1.2 wt. %, or from about 0.8 to about 1.2 wt. %, or from about 0.8 to about 1.1 wt. %.

In certain embodiments, the organic linker is present in an amount sufficient to provide monolayer coverage of the surface of the particulate, i.e., the organic linker is present as a single layer of molecules about the surface of the particulate. The sufficient amount will vary depending on, for example, the particle size distribution of the particulate and the specific form of organic linker. In certain embodiment, a sufficient amount ranges from about 0.1 to about 5 wt. %, based on the total weight of the compatibilizer, for example, from about 0.5 to about 2 wt. %.

The compatibilizer may be prepared by a method comprising combining an organic linker as defined herein with a particulate as defined herein, and mixing using conventional method, for example, using a Steele and Cowlishaw high intensity mixer, preferably at a temperature of equal to or less than 80 deg C., for example, at a temperature ranging from about 25° C. to about 80° C., or from about 25° C. to about 60° C., or from about 25° C. to about 40° C., or from about 25° C. to about 35° C., or from about 28° C. to about 32° C. The organic linker may be combined with the particulate after grinding the particulate, but before the particulate is added to the polymer blend.

For example, the organic linker may be added to the particulate in a step in which the particulate is mechanically de-aggregated. The organic linker may be combined during de-aggregation carried out in a milling machine.

In certain embodiments, the method comprises mixing an organic acid precursor of the organic linker with the particulate while the particulate is maintained in a dispersed state, and heating the mixture, for example, at a temperature of no greater than about 80° C., or any of the other temperature or ranges described above. Heating facilitates (i.e., by dehydration) the conversion of at least a portion of the organic acid to the basic form of the organic acid. In certain embodiments, substantially all of the organic acid is converted to its basic form. The compatibilizer may be prepared in the presence of a peroxide-containing additive, as described below.

The polymer blend comprises different polymer types, for example, a mixture of polyethylene and polypropylene, or a mixture of at least two different types of polyethylene, or a mixture of different types of polyethylene and propylene, or a mixture of recycled polymer and virgin polymer.

In certain embodiments, the polymer blend comprises a mixture of different types of polyethylene, e.g., HDPE, LDPE, LLDPE, and/or MDPE.

In certain embodiments, at least 75% by weight of the polymer blend is a mixture of polyethylene and polypropylene, for example, a mixture of HDPE and polypropylene (based on the total weight of polymer in the polymer blend), for example, from 75% to about 99% of a mixture of polyethylene and polypropylene, for example, a mixture of HDPE and polypropylene. In such embodiments, HDPE may constitute from about 50% to about 95% by weight of the polymer blend (based on the total weight of the polymer of the filled polymer resin), for example, from about 60% to about 90% by weight, or from about 70% to about 90% by weight, of from about 70% to about 85% by weight, or from about 70% to about 80% by weight, or from about 75% to about 80% by weight of the polymer blend (based on the total weight of the polymer of the polymer blend).

In certain embodiments, the HDPE is mixture of HDPE from different sources, for example, from different types of post-consumer polymer waste, e.g., recycled blow-moulded HDPE and/or recycled injection moulded HDPE.

Generally, HDPE is understood to be a polyethylene polymer mainly of linear, or unbranched, chains with relatively high crystallinity and melting point, and a density of about 0.96 g/cm$^3$ or more. Generally, LDPE (low density polyethylene) is understood to be a highly branched polyethylene with relatively low crystallinity and melting point, and a density of from about 0.91 g/cm$^3$ to about 0.94 g/cm.

Generally, LLDPE (linear low density polyethylene) is understood to be a polyethylene with significant numbers of short branches, commonly made by copolymerization of ethylene with longer-chain olefins. LLDPE differs structurally from conventional LDPE because of the absence of long chain branching.

In certain embodiments, the polymer blend comprises up to about 20% by weight of polymers other than HDPE such as, for example, LDPE, LLDPE and polypropylene, any or all of which may be recycled from polymer waste, e.g., post-consumer polymer waste. In certain embodiments, the recycled polymer comprises up to about 20% by weight polypropylene, based on the total weight of the recycled polymer, for example, from about 1% to about 20% by weight, or from about 5% to about 18% by weight, or from about 10% to about 15% by weight, or from about 12 to about 14% by weight polypropylene.

In certain embodiments, polymer blend (i.e., comprising the compatibilizer and additional optional components) has a density of greater than about 1.00 to equal to or less than about 1.05 g/cm$^3$. Density may be determined in accordance with ISO1183.

In certain embodiments, the polymer blend comprises at least about 50% by weight recycled polymer (based on the total weight of polymer in the polymer blend), for example, at least about 60% by weight, or at least about 70% by weight, or at about 80% by weight, or at least about 95% by weight, or at least about 99% by weight recycled polymer. In certain embodiments, recycled polymer constitutes substantially all, i.e., about 100% by weight, of the polymer of the polymer blend.

In certain embodiments, the polymer blend comprises no more than about 20% by weight of virgin polymer (based on the total weight of polymer in the polymer blend), for example, no more than about 15% by weight of virgin polymer, or no more than about 10% by weight of virgin polymer, or no more than about 5% by weight of virgin polymer, or no more than about 2% by weight of virgin polymer, or no more than about 1% by weight of virgin polymer, or no more than about 0.5% by weight of virgin polymer, or no more than about 0.1% by weight of virgin polymer.

In certain embodiments, the polymer blend is free of virgin polymer.

The polymer blend may additionally comprise a peroxide-containing additive. In an embodiment, the peroxide-containing additive comprises di-cumyl peroxide or 1,1-Di(tert-butylperoxy)-3,3,5-trimethylcyclohexane. The peroxide-containing additive may not necessarily be included with the compatibilizer and instead may be added during the compounding of the compatibilizer and the mixture of different polymer types, as described herein. In some polymer systems, e.g., those containing HDPE, the inclusion of a peroxide-containing additive may promote cross-linking of the polymer chains. In other polymer systems, e.g., polypropylene, the inclusion of a peroxide-containing additive may promote polymer chain scission. The peroxide-containing additive may be present in amount effective to achieve the desired result. This will vary between compatibilizer and may depend upon the precise composition of the compatibilizer and the polymer. For example, the peroxide-containing additive may be present in an amount equal to or less than about 1 wt. % based on the weight of the polymer blend to which the peroxide-containing additive is to be added, for example, equal to or less than about 0.5 wt. %, for example equal to or less than about 0.3 wt. %, for example, equal to or less than about 0.1 wt %, for example equal to or less than about 0.09 wt. %, or for example equal to or less than about 0.08 wt. % or for example, equal to or less than about 0.06 wt. %. Typically, the peroxide-containing additive, if present, is present in an amount greater than about 0.01 wt. % based on the weight of the polymer blend.

The polymer blend may additionally comprise an antioxidant. Suitable antioxidants include, but are not limited to, organic molecules consisting of hindered phenol and amine derivatives, organic molecules consisting of phosphates and lower molecular weight hindered phenols, and thioesters. Exemplary antioxidants include Irganox 1010 and Irganox 215, and blends of Irganox 1010 and Irganox 215. The amount of antioxidant may range from about 0.01% by weight to about 5% by weight, based on polymer content, for example, from about 0.05% by weight to about 2.5% by weight, or from about 0.05% by weight to about 1.5% by weight, or from about 0.05% by weight to about 1.0% by weight, or from about 0.05% by weight to about 0.5% by weight, or from about 0.05% by weight to about 0.25% by weight, or from about 0.05% by weight to about 0.15% by weight based on polymer content.

In certain embodiments, the polymer blend comprises an impact modifier, for example, up to about 20% by weight of an impact modifier, based on the total weight of the filled polymer resin, for example, from about 0.1% by weight to about 20% by weight, or from about 0.5% by weight to about 15% by weight, or from about 1% by weight to about 12.5% by weight, or from about 2% by weight to about 12. % % by weight, or from about 1% by weight to about 10% by weight, or from about 1% by weight to about 8% by weight, or from about 1% by weight to about 6% by weight, or from about 1% by weight to about 4% by weight of an impact modifier, based on the total weight of the polymer blend.

In certain embodiments, the impact modifier is an elastomer, for example, a polyolefin elastomer. In certain embodiments, the polyolefin elastomer is a copolymer of ethylene and another olefin (e.g., an alpha-olefin), for example, octane, and/or or butene and/or styrene. In certain embodiments, the impact modifier is a copolymer of ethylene and octene. In certain embodiments, the impact modifier is a copolymer of ethylene and butene.

In certain embodiments, the impact modifier is a recycled (e.g., post industrial) impact modifier.

In certain embodiments, the impact modifier, for example, polyolefin copolymer as described above, such as an ethylene-octene copolymer, has a density of from about 0.80 to about 0.95 g/cm$^3$ and/or a MFI of from about 0.2 g/10 min (2.16 kg@190° C.) to about 30 g/10 min (2.16 kg@190° C.), for example, from about 0.5 g/10 min (2.16 kg@190° C.) to about 20 g/10 min (2.16 kg@190° C.), or from about 0.5 g/10 min (2.16 kg@190° C.) to about 15 g/10 min (2.16 kg@190° C.), or from about 0.5 g/10 min (2.16 kg@190° C.) to about 10 g/10 min (2.16 kg@190° C.), or from about 0.5 g/10 min (2.16 kg@190° C.) to about 7.5 g/10 min (2.16 kg@190° C.), or from about 0.5 g/10 min (2.16 kg@190° C.) to about 5 g/10 min (2.16 kg@190° C.), or from about 0.5 g/10 min (2.16 kg@190° C.) to about 4 g/10 min (2.16 kg@190° C.), or from about 0.5 g/10 min (2.16 kg@190° C.) to about 3 g/10 min (2.16 kg@190° C.), or from about 0.5 g/10 min (2.16 kg@190° C.) to about 2.5 g/10 min (2.16 kg@190° C.), or from about 0.5 g/10 min (2.16 kg@190° C.) to about 2 g/10 min (2.16 kg@190° C.), or from about 0.5 g/10 min (2.16 kg@190° C.) to about 1.5 g/10 min (2.16 kg@190° C.). In such or certain embodiments, the impact modifier is an ethylene-octene copolymer having a density of from about 0.85 to about 0.86 g/cm$^3$. Exemplary impact modifiers are polyolefin elastomers made by DOW under the Engage® brand, for example, Engage® 8842. In such embodiments, the compounded polymer blend may additionally comprise an antioxidant, as described herein.

In certain embodiments, the impact modifier is a copolymer based on styrene and butadiene, for example, a linear block copolymer based on styrene and butadiene. In such embodiments, the impact modifier may have a MFI of from about from about 1 to about 5 g/10 min (200° C. @ 5.0 kg), for example, from about 2 g/10 min (200° C. @ 5.0 kg) to about 4 g/10 min (200° C. @ 5.0 kg), or from about 3 g/10 min (200° C. @ 5.0 kg) to about 4 g/10 min (200° C. @ 5.0 kg). In such embodiments, the linear block copolymer may be a recycled linear block copolymer.

In certain embodiments, the impact modifier is a copolymer based on styrene and isoprene, for example, a linear block copolymer based on styrene and isoprene. In such embodiments, the impact modifier may have a MFI of from about from about 5 to about 20 g/10 min (230° C. @ 2.16), for example, from about 8 g/10 min (230° C. @ 2.16 kg) to about 15 g/10 min (230° C. @ 2.16 kg), or from about 10 g/10 min (230° C. @ 2.16 kg) to about 15 g/10 min (230° C. @ 2.16 kg). In such embodiments, the linear block copolymer may be recycled.

In certain embodiments, the impact modifier is a triblock copolymer based on styrene and ethylene/butene. In such embodiments, the impact modifier may have a MFI of from about 15 g/10 min (200° C. @ 5.0 kg) to about 25 g/10 min (200° C. @ 5.0 kg), for example, from about 20 g/10 min (200° C. @ 5.0 kg) to about 25 g/10 min (200° C. @ 5.0 kg).

MFI may be determined in accordance with ISO 1133.

In certain embodiments, there is crosslinking between the impact modifier and one or more polymers of the polymer blend, for example, in embodiments in which the impact modifier is a linear block copolymer based on styrene and butadiene, or on styrene and isoprene, and/or the polymer blend comprises PE. In some embodiments, the impact modifier may be miscible in the polymer blend.

The polymer blend may be made a method comprising preparing, providing or obtaining a compatibilizer as described herein, and compounding with the mixture of different polymer types.

In certain embodiments, the compatibilizer is prepared in a first location and is transported to a second location and combined with the mixture of different polymer types.

In certain embodiments, the polymer blend and compatibilizer are compounded in the presence of a peroxide-containing additive, as described herein.

In certain embodiments, the polymer blend comprises a secondary filler component, for example, talc, which may added during compounding of the polymer blend and compatibilizer and optional peroxide-containing additive.

Compounding per se is a technique which is well known to persons skilled in the art of polymer processing and manufacture. It is understood in the art that compounding is distinct from blending or mixing processes conducted at temperatures below that at which the constituents become molten.

Compounding may be carried out using a twin screw compounder, for example, a Baker Perkins 25 mm twin screw compounder. The polymers, compatibilizer and optional peroxide containing additive may be premixed and fed from a single hopper. Alternatively, at leas the polymers and compatibilizer may be fed from separate hoppers. The resulting melt may be cooled, for example, in a water bath, and then pelletized. Test pieces may be injection moulded, or extruded, or cast or blown.

The compounded compositions may further comprise additional components, such as slip aids (for example Erucamide), process aids (for example Polybatch® AMF-705), mould release agents and antioxidants. Suitable mould release agents will be readily apparent to one of ordinary skill in the art, and include fatty acids, and zinc, calcium, magnesium and lithium salts of fatty acids and organic phosphate esters. Specific examples are stearic acid, zinc stearate, calcium stearate, magnesium stearate, lithium stearate, calcium oleate and zinc palmitate. Slip and process aids, and mould release agents may be added in an amount less than about 5 wt. % based on the weight of the masterbatch.

Polymer articles may then be extruded, compression moulded or injected moulded using conventional techniques known in the art, as will be readily apparent to one of ordinary skill in the art.

The articles which may be formed from the polymer blends are many and various.

In certain embodiments, the article of manufacture is the form of one of the following: panels (e.g., automotive panels), pallets, pipes, doors, shutters, awnings, shades, signs, frames, window casings, mobile phone casings, pails, backboards, wallboards, flooring, tiles, railroad ties, forms, trays, tool handles, stalls, bedding, dispensers, staves, totes, barrels, boxes, packing materials, baskets, racks, casings, binders, dividers, walls, mats, frames, bookcases, sculptures, chairs, tables, desks, art, toys, games, wharves, piers, boats, masts, septic tanks, substrates, computer housings, above- and below-ground electrical casings, PCB covers, furniture, picnic tables, tents, playgrounds, benches, shelters, sporting goods, bedpans, plaques, trays, hangers, servers, pools, insulation, caskets, bookcovers, canes, crutches, luggage buckle and clips, pump parts, and the like.

In certain embodiments, articles of manufacture include injected moulded or extruded components such as, for example, industrial, commercial and residential piping and tubing, including underground water and sewage pipes, surface ground water piping, cable protection piping, piping for plumbing, and guttering for buildings, for example, commercial or residential buildings, pallets (including, for example, those used to cover or bridge across surface defects in roads or pavements, or pallets used in storage and transport of goods), and garden decking materials.

The polymer composition may used to modify, for example, enhance or improve, a mechanical property of an article of manufacture, by forming the article of manufacture from the polymer blend. The mechanical property may be selected from one or more of resilience (toughness), elongation at break, flexural modulus (stiffness) and deflection (ductility). In this regard, it has unexpectedly been found that synergistic improvements in mechanical properties, such as resilience, may be obtained by using at least two different polymer types in combination with the compatibilizer as described herein. The effects obtainable enables use of mixed polymers such as recycled polymer waste containing different types of polymer to achieve comparable or even better mechanical properties compared to polymer compositions absent compatibilizer (with the concomitant environmental benefits). Moreover, the coupling effect means that less polymer (recycled or virgin) can be used (i.e., by replacing a portion with the compatibilizer) without adversely effecting mechanical properties and, in some embodiments, improving mechanical properties (with the concomitant cost benefits).

For the example, in certain embodiments, the resilience of an article formed from a polymer blend filled with the compatibilizer is improved compared to an article formed from a polymer blend filled with only the particulate of the compatibilizer, and/or (ii) the flexural modulus of an article formed from a polymer blend filled with the compatibilizer is at least about 92% of the flexural modulus of an article formed from a polymer blend filled with only the particulate of the compatibilizer.

In certain embodiments, the resilience of the article from a polymer blend filled with the compatibilizer is at least about 50% greater than an article formed from a polymer blend filled with only the particulate of the compatibilizer, for example, at least about 75% greater, or at least about 100% greater (i.e., double the resilience), or at least about 125% greater, or at least about 150% greater, or at least about 175% greater, or at least about 200% greater. In certain embodiments, the resilience of the article formed from a polymer blend filled with the compatibilizer is no more than about 300% greater than an article formed from a polymer blend filled with only the particulate of the compatibilizer, for example, no more than about 275% greater, or no more than about 250% greater.

In certain embodiments, the flexural modulus of an article formed from the polymer blend filled with the compatibilizer is from about 92% to about 95% of the flexural modulus of an article formed from a polymer blend filled with only the particulate of the compatibilizer.

In certain embodiments, the article of manufacture has:
(i) a resilience of greater than greater than 70 kJ/m² @ −20° C., for example, from about 75 to about 125 kJ/m² @ −20° C.; and/or
(ii) a flexural modulus greater than 700 MPa, for example, greater than 800, or greater greater than 900 MPa, or greater than 950 MPa, or from about 900 MPa to less than about 1800 MPa, or from about 900 to less than about 1400 MPa, or from about 900 to less than about 1000 MPa.

Resilience may be determined in accordance with ISO 179. In certain embodiments, the article of manufacture does not fail when its resilience is determined in accordance with ISO 179.

Flexural modulus may be determined in accordance with ISO 178.

Additional Components

In certain embodiments, the polymer blend comprises a coupling modifier in addition to the compatibilizer. The coupling modifier comprises a compound including a terminating propanoic group or ethylenic group with one or two adjacent carbonyl groups. A function of the coupling modifier is to couple polymeric species present in the polymer blend. Without wishing to be bound by theory, it is believed that coupling involves a physical (e.g., steric) and/or chemical (e.g., chemical bonding, such as covalent or van der Waals) interaction between the polymers and the coupling modifier.

In one embodiment, the coupling modifier has a formula (1):

A-(X—Y—CO)$_m$(O—B—CO)$_n$OH    (1)

wherein
A is a moiety containing a terminating ethylenic bond with one or two adjacent carbonyl groups;
X is O and m is 1 to 4 or X is N and m is 1;
Y is C$_{1-18}$-alkylene or C$_{2-18}$-alkenylene;
B is C$_{2-6}$-alkylene; n is 0 to 5;
provided that when A contains two carbonyl groups adjacent to the ethylenic group, X is N.

In an embodiment, A-X— is the residue of acrylic acid, optionally wherein (O—B—CO)$_n$ is the residue of δ-valerolactone or ε-caprolactone or a mixture thereof, and optionally wherein n is zero.

In another embodiment, A-X— is the residue of maleimide, optionally wherein (O—B—CO)$_n$ is the residue of δ-valerolactone or ε-caprolactone or a mixture thereof, and optionally wherein n is zero.

Specific examples of coupling modifiers are β-carboxy ethylacrylate, β-carboxyhexylmaleimide, 10-carboxydecylmaleimide and 5-carboxy pentyl maleimide. Exemplary coupling modifiers and there methods of preparation are described in U.S. Pat. No. 7,732,514, the entire contents of which is hereby incorporated by reference.

In another embodiment, the coupling modifier is β-acryloyloxypropanoic acid or an oligomeric acrylic acid of the formula (2):

CH$_2$=CH—COO[CH$_2$—CH$_2$—COO]$_n$H    (2)

wherein n represents a number from 1 to 6.

In an embodiment, n is 1, or 2, or 3, or 4, or 5, or 6.

The oligomeric acrylic acid of formula (2) may be prepared by heating acrylic acid in the presence of 0.001 to 1% by weight of a polymerization inhibitor, optionally under elevated pressure and in the presence of an inert solvent, to a temperature in the range from about 50° C. to 200° C. Exemplary coupling modifiers and their methods of preparation are described in U.S. Pat. No. 4,267,365, the entire contents of which is hereby incorporated by reference.

In another embodiment, the coupling modifier is β-acryloyloxypropanoic acid. This species and its method of manufacture is described in U.S. Pat. No. 3,888,912, the entire contents of which is hereby incorporated by reference.

The coupling modifier may be present in an amount effective to achieve the desired result. For example, the coupling modifier may be present in an amount equal to or less than about 5 wt. % based on the total weight of the particulate of the polymer blend, for example equal to or less than about 2 wt. % or, for example equal to or less than about 1.5 wt. % or, for example, equal to or less than about 1.0 wt. % or, for example, equal to or less than about 0.75 wt. %, or equal to or less than about 0.5 wt. %. In certain embodiments, the coupling modifier is present in an amount equal to or greater than about 0.1 wt. %.

For the avoidance of doubt, the present application is directed to the subject-matter described in the following numbered paragraphs:

1. Compatibilizer for a polymer blend, the compatibilizer comprising a particulate and an organic linker on a surface of the particulate, wherein the organic linker is a basic form of an organic acid comprising an oxygen-containing acid functionality and at least one carbon-carbon double bond.

2. Compatibilizer for a polymer blend, the compatibilizer comprising a particulate and organic linker on a surface of the particulate, wherein the compatibilizer is obtained by at least partially dehydrating an organic acid having an oxygen-containing acid functionality and comprising at least one carbon-carbon double bond in the presence of the particulate.

3. Compatibilizer according to numbered paragraph 1 or 2, wherein the organic linker is the conjugate base of said organic acid.

4. Compatibilizer according to numbered paragraph 1, 2 or 3, wherein the organic acid is an unsaturated fatty acid or derived from an unsaturated fatty acid.

5. Compatibilizer according to any preceding numbered paragraph, wherein the organic linker comprises six or more carbon atoms.
6. Compatibilizer according to any preceding numbered paragraph, wherein the organic linker is:

and/or wherein a is equal to or greater than 3;
wherein b is equal to or greater than 1, and c is equal to or greater than 0, provided that b+c is at least 2; and
wherein Z is a carboxylate group, a phosphate group, a phosphite or a phosphinate group.
7. Compatibilizer according to numbered paragraph 6, wherein a is from 6 to 10, for example, a is 8.
8. Compatibilizer according to numbered paragraph 6 or 7, wherein b and c are each independently from 4 to 10, for example, each independently from 6 to 8.
9. Compatibilizer according to any one of numbered paragraphs 6-8, wherein b and c are both 7.
10. Compatibilizer according to any preceding numbered paragraph, wherein the organic linker is a carboxylate.
11. Compatibilizer according to any preceding numbered paragraph, wherein the organic acid is oleic acid and/or undecylenic acid.
12. Compatibilizer according to any preceding numbered paragraph, wherein the compatibilizer consists essentially of, or consists of, the particulate and the organic linker.
13. Compatibilizer according to numbered paragraph 12, wherein the organic linker is the basic form of oleic acid.
14. Compatibilizer according to numbered paragraph 12, wherein the organic linker is the basic form of undecylenic acid.
15. Compatibilizer according to any preceding numbered paragraph, wherein the particulate is an inorganic particulate, for example, a mineral particulate.
16. Compatibilizer according to numbered paragraph 15, wherein the particulate is an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof.
17. Compatibilizer according to any preceding numbered paragraph, wherein the particulate, for example, inorganic particulate, has a $d_{50}$ of less than about 2.5 μm, for example, equal to or less than about 1.5 μm.
18. Compatibilizer according to any preceding numbered paragraph, wherein the particulate is calcium carbonate, for example, ground calcium carbonate.
19. Use of a compatibilizer according to any one of numbered paragraphs 1-18 in a polymer blend.
20. Use of an organic linker as defined in any one of numbered paragraphs 1-14 in a compatibilizer for a polymer blend.
21. Use according to numbered paragraph 20, wherein: (i) the resilience of an article formed from a polymer blend filled with the compatibilizer is improved compared to an article formed from a polymer blend filled with only the particulate of the compatibilizer, and/or (ii) the flexural modulus of an article formed from a polymer blend filled with the compatibilizer is at least about 92% of the flexural modulus of an article formed from a polymer blend filled with only the particulate of the compatibilizer.
22. Polymer blend comprising a compatibilizer according to any one of numbered paragraphs 1-18.
23. Polymer blend according to numbered paragraph 22, further comprising a peroxide-containing additive.
24. Polymer blend according to numbered paragraph 22 or 23, further comprising filler other than the functional filler.
25. Method for making a compatibilizer for a polymer blend, the method comprising combining an organic linker as defined in any one of numbered paragraphs 1-14 with a particulate, for example, a particulate as defined in any one of numbered paragraphs 15-18.
26. Method according to numbered paragraph 25, comprising mixing an organic acid form of the organic linker with the particulate while the particulate is maintained in a dispersed state, and heating the mixture, for example, at a temperature of no greater than about 80° C., to convert at least a portion of the organic acid to the basic form of the organic acid.
27. Method for making a polymer blend comprising a compatibilizer, the method comprising preparing, providing or obtaining a compatibilizer according to any one of numbered paragraphs 1-18, and compounding the compatibilizer with a polymer blend, optionally wherein the compatibilizer is prepared in accordance with the method of numbered paragraph 26.
28. Method according to numbered paragraph 27 wherein the polymer blend and compatibilizer are compounded in the presence of a peroxide-containing additive.
29. Method according to numbered paragraph 27 or 28, further comprising adding a secondary filler during compounding.
30. Article formed from a polymer blend according to any one of numbered paragraphs 22-24 or obtainable by the method of any one of numbered paragraphs 27-29.
31. Article according to numbered paragraph 30, wherein the article has (i) a resilience which is at least about 50% greater than an article formed from a polymer blend filled with only the particulate of the compatibilizer; and/or (ii) a flexural modulus which is at least about 92% of the flexural modulus of an article formed from a polymer blend filled with only the particulate of the compatibilizer.
32. Use of a polymer blend according to any one of numbered paragraphs 22-24 in the manufacture of an article.
33. A method for making an article according to numbered paragraph 30, comprising forming the article from a polymer blend according to any one of numbered paragraphs 22-24, optionally wherein forming comprises extrusion or moulding, for example, injection or blow moulding.
34. Use, polymer blend, method or article according to any preceding numbered paragraph, wherein the polymer blend comprises a mixture of polyethylene (PE) and polypropylene PP, for example, a mixture of high density PE (HDPE) and PP.
35. Use, polymer blend, method or article according to any preceding numbered paragraph, wherein the polymer blend comprises at least about 50% by weight recycled polymer, based on the total weight of polymer in the polymer blend.
36. Use, polymer blend, method or article according to any preceding numbered paragraph, wherein the polymer blend comprises up to about 70% by weight of compatibilizer, based on the total weight of the polymer blend, for example, from about 10% by weight to about 30% by weight of compatibilizer.

EXAMPLES

Example 1 Preparation of Polymer Blends Comprising Compatibilizer

Two unsaturated carboxylic acids were tested:
1. Undecylenic acid
2. Oleic acid

The particulate was a ground calcium carbonate having a $d_{50}$ of 1 μm and a $d_{90}$ of 2 μm.

The compatibilizer was prepared by the following two-step process:

First Step:

The unsaturated carboxylic acid was added to the particulate while it was maintained in a dispersed state using a Steele and Cowlishaw high shear mixer running at 3000 rpm and heated to 30° C.

Second Step:

PE/PP (75/25 wt. %/wt. %) blends were compounded with a twin screw-extruder in presence of various amounts (15 wt. % and 20 wt. %) of compatibilizer and in the presence of dicumyl peroxide.

Comparative polymer blends comprising particulate only (i.e., without compatibilizer) were also prepared.

Example 2 Mechanical Testing of Parts Made from Polymer Blend of Example 1

Figure 1:
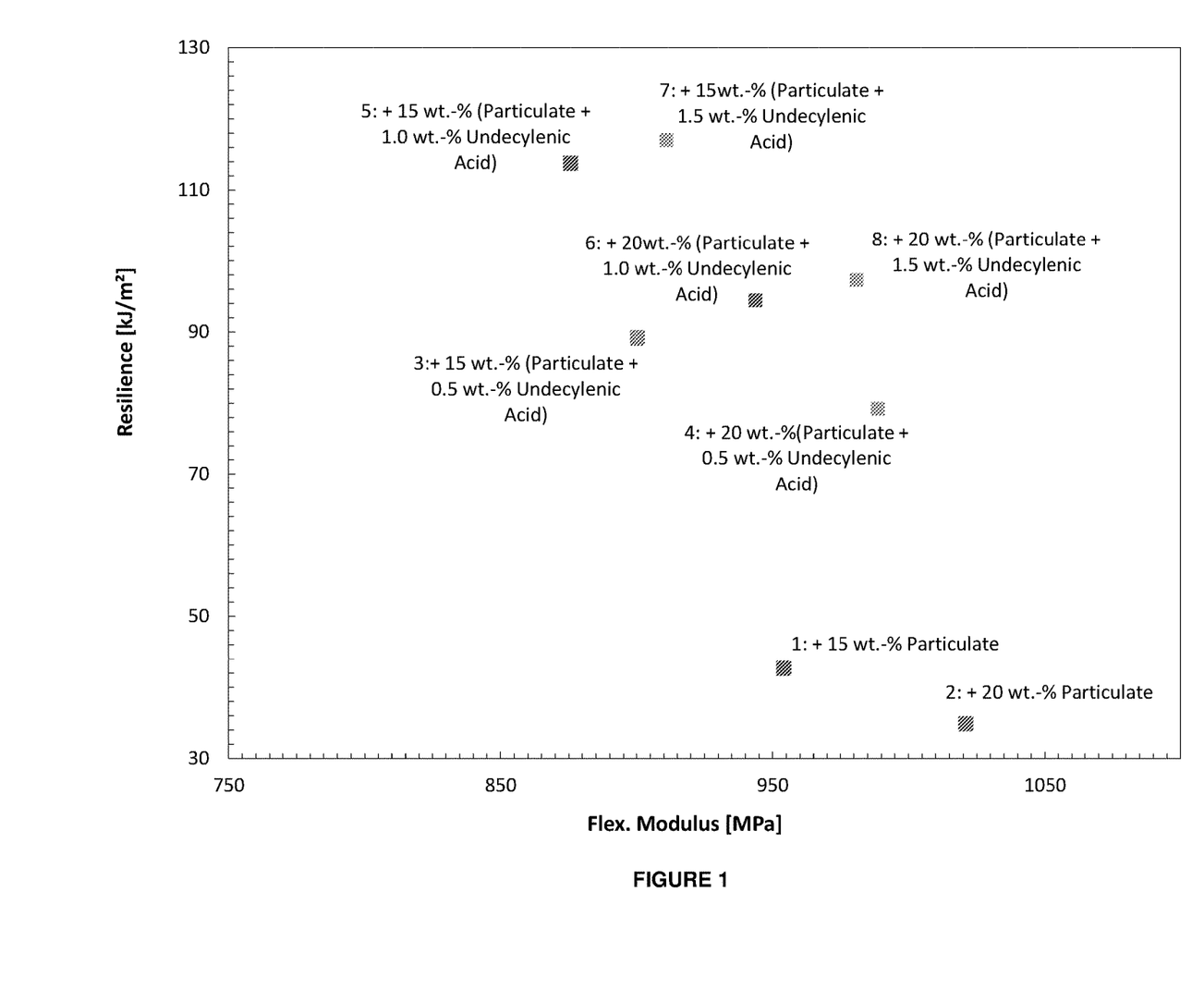
FIG. 1 is a graph summarizing mechanical properties of exemplary polymer blends comprising compatibilizer based on undecylenic acid, and comparative polymer blends.
Figure 2:
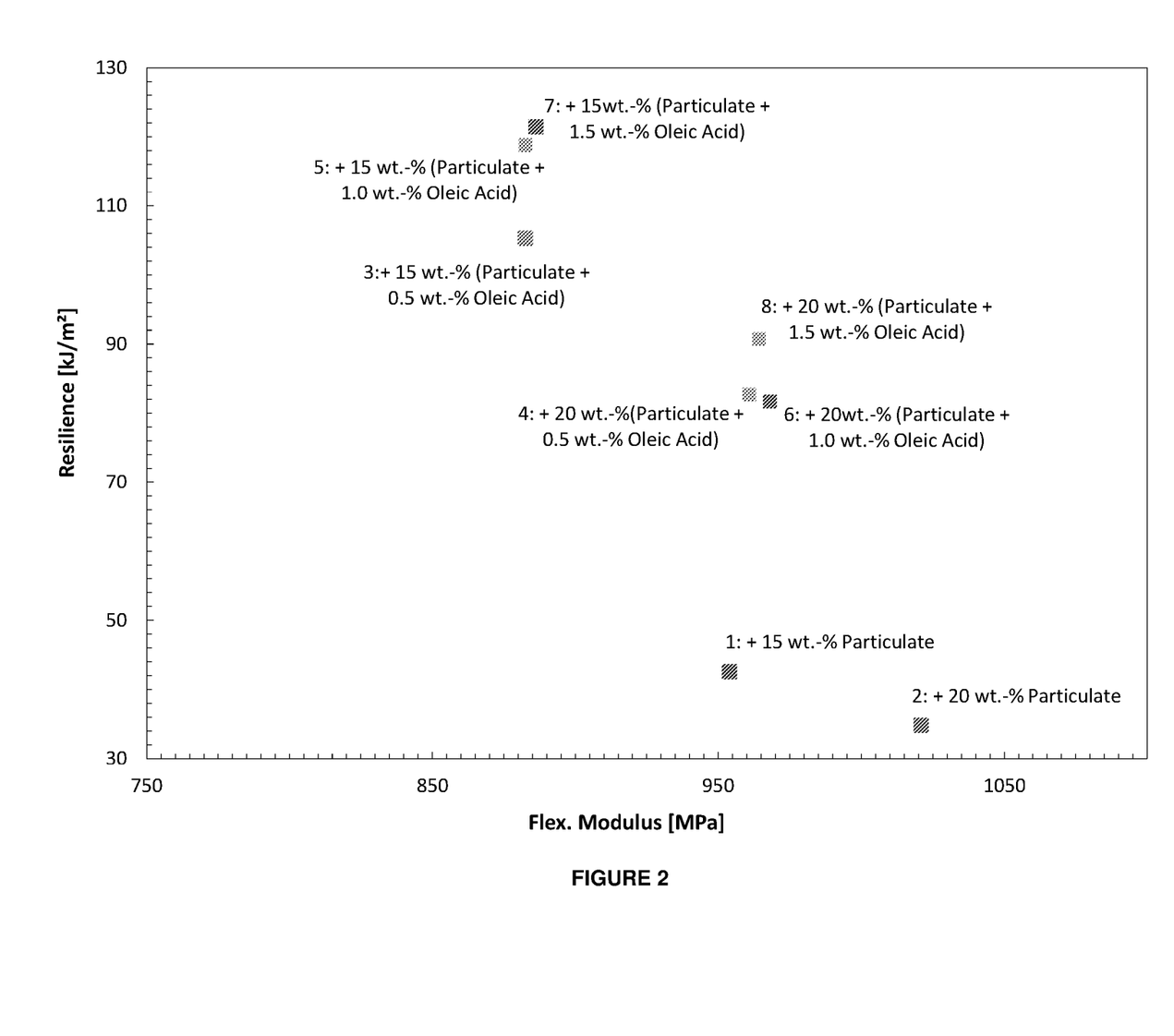
FIG. 2 is a graph summarizing mechanical properties of exemplary polymer blends comprising compatibilizer based on oleic acid, and comparative polymer blends.

Extruded test pieces were tested for resilience and flexural modulus. Results are summarized in FIGS. 1 and 2, respectively.

The invention claimed is:

1. A compatibilizer for a polymer blend, the compatibilizer comprising a particulate and an organic linker on a surface of the particulate, wherein:
    the organic linker is a basic form of an organic acid comprising an oxygen containing acid functionality and at least one carbon-carbon double bond;
    the particulate is an alkaline earth metal carbonate or sulphate, a hydrous kandite clay, an anhydrous (calcined) kandite clay, or combinations thereof,
    the particulate has a $d_{50}$ of from about 0.5 μm to equal to or less than 1.5 μm; and
    the organic linker is:

$$CH2=CH—(CH2)_a\text{-}Z \qquad (1)$$

wherein a is equal to or greater than 3; and
    wherein Z is a carboxylate group, a phosphate group, a phosphite or a phosphinate group.

2. A compatibilizer according to claim 1, wherein the organic linker is the conjugate base of said organic acid.

3. A compatibilizer according to claim 1, wherein the organic acid is an unsaturated fatty acid or derived from an unsaturated fatty acid.

4. A compatibilizer according to claim 1, wherein the organic linker comprises six or more carbon atoms.

5. A compatibilizer according to claim 1, wherein a is from 6 to 10.

6. A compatibilizer according to claim 1, wherein the organic linker is a carboxylate.

7. A compatibilizer according to claim 1, wherein the organic acid is undecylenic acid.

8. A compatibilizer according to claim 1, wherein the compatibilizer consists essentially of the particulate and the organic linker.

9. A compatibilizer according to claim 8, wherein the organic linker is the basic form of undecylenic acid.

10. A compatibilizer according to claim 1, wherein the particulate is calcium carbonate.

11. A polymer blend comprising a mixture of polyethylene and polypropylene and a compatibilizer, wherein
    the compatibilizer comprises a particulate and an organic linker on a surface of the particulate, wherein
        the organic linker is a basic form of an organic acid comprising an oxygen-containing acid functionality and at least one carbon-carbon double bond;
        the particulate is an alkaline earth metal carbonate or sulphate, a hydrous kandite clay, an anhydrous (calcined) kandite clay, or combinations thereof;
        the particulate has a $d_{50}$ of from about 0.5 μm to equal to or less than 1.5 μm; and
        the organic linker is:

$$CH2=CH—(CH2)_a\text{-}Z \qquad (1)$$

wherein a is equal to or greater than 3; and
        wherein Z is a carboxylate group, a phosphate group, a phosphite or a phosphinate group.

12. A polymer blend according to claim 11, further comprising a peroxide-containing additive.

13. A polymer blend according to claim 11, wherein the compatibilizer is a first filler and the polymer blend further comprises a second filler.

14. An article comprising the polymer blend of claim 11, wherein the article has
    (i) a resilience which is at least about 50% greater than an article formed from a polymer blend comprising the mixture of different polymer types filled with only the particulate of the compatibilizer; and/or
    (ii) a flexural modulus which is at least about 92% of the flexural modulus of an article formed from a polymer blend comprising the mixture of different polymer types filled with only the particulate of the compatibilizer.

15. A polymer blend according to claim 11, wherein the polymer blend comprises at least about 50% by weight recycled polymer, based on the total weight of polymer in the polymer blend.

16. A polymer blend according to claim 11, wherein the polymer blend comprises up to about 70% by weight of compatibilizer, based on the total weight of the polymer blend.

17. A compatibilizer according to claim 10, wherein the calcium carbonate is ground calcium carbonate.

* * * * *